(12) United States Patent
De Mazière et al.

(10) Patent No.: US 7,766,139 B2
(45) Date of Patent: Aug. 3, 2010

(54) METHOD OF OPERATING A DCT HYDRAULIC POWER CONTROL SYSTEM AS WELL AS DCT HYDRAULIC POWER CONTROL SYSTEM

(75) Inventors: Filip De Mazière, Heusden-Destelbergen (BE); Johan Wallaert, Sint Michiels (BE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 481 days.

(21) Appl. No.: 11/879,477

(22) Filed: Jul. 17, 2007

(65) Prior Publication Data
US 2008/0035443 A1 Feb. 14, 2008

(30) Foreign Application Priority Data
Jul. 17, 2006 (EP) .................................. 06014825

(51) Int. Cl.
*F16D 48/02* (2006.01)
(52) U.S. Cl. ................. 192/3.58; 192/87.13; 192/113.3
(58) Field of Classification Search .............. 192/87.13, 192/87.18, 87.19
See application file for complete search history.

(56) References Cited

U.S. PATENT DOCUMENTS 6,361,287 B1 3/2002 Hopper 6,631,651 B2 * 10/2003 Petrzik .......................... 74/346
2004/0237681 A1 * 12/2004 Wheals et al. ................. 74/335
2006/0006043 A1 * 1/2006 Koenig et al. ............. 192/113.3

FOREIGN PATENT DOCUMENTS

EP 1420186 A2 * 5/2004
WO WO 2004/092618 A1 * 10/2004

OTHER PUBLICATIONS

Machine translation of EP 1420186A2.*

* cited by examiner

*Primary Examiner*—Richard M. Lorence
(74) *Attorney, Agent, or Firm*—Tarolli, Sundheim, Covell & Tummino LLP

(57) ABSTRACT

A DCT hydraulic power control system has a pump, a high pressure section for providing oil to actuators of the DCT, a low pressure section for providing oil to a lubrication and cooling system of the DCT, and a regulator for directing excess oil from the high pressure section to the lubrication and cooling section. A hydraulic control includes a first directional valve disposed in a main line of the low pressure section between the pump and the lubrication and cooling system, wherein the directional valve is controlled by an ON/OFF valve disposed between a check valve and the directional valve, wherein the check valve is disposed in a branch line of the low pressure section leading to the high pressure section, and wherein a second directional valve connects the second pressure outlet associated to the low pressure section with a suction side of the pump.

7 Claims, 1 Drawing Sheet

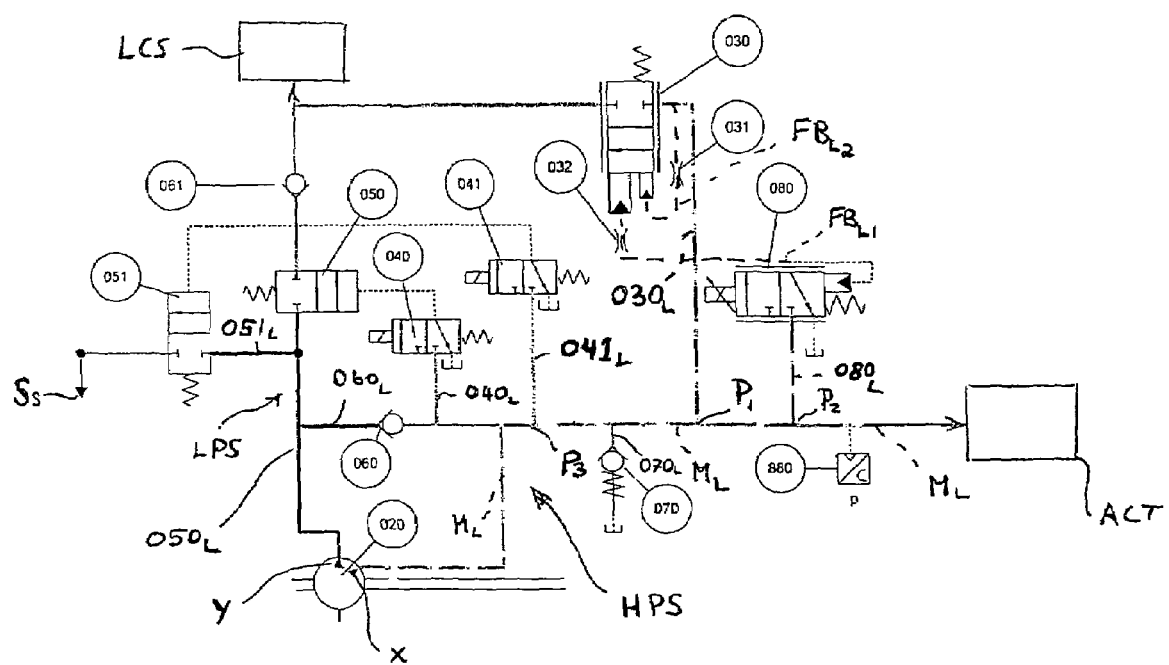

METHOD OF OPERATING A DCT HYDRAULIC POWER CONTROL SYSTEM AS WELL AS DCT HYDRAULIC POWER CONTROL SYSTEM

CROSS REFERENCE TO RELATED APPLICATIONS

Priority is hereby claimed to European Patent App. No. 06014825.1 filed on Jul. 17, 2006, the entire contents of which are incorporated herein by reference.

FIELD OF THE INVENTION

The present invention relates to a method of operating a DCT hydraulic power control system as well as a DCT hydraulic power control system.

BACKGROUND

Known methods and systems of DCT hydraulic power control suffer from the drawback of excessive power consumption due to poor control characteristics.

SUMMARY

In some embodiments, a method of operating a DCT hydraulic power control system is provided, wherein reduced power consumption can be achieved simultaneously with optimized control characteristics.

A hydraulic power control system of a double clutch transmission (DCT) comprises pump means for providing desired oil flow under desired oil pressure conditions. In some embodiments, a feature of the control system includes a high pressure section for providing oil to actuators of the DCT by activating respective clutches and moving synchronizers, so that the high pressure section is the section for the overall activation of all moving parts of a double clutch transmission.

The low pressure section, in turn, is capable of cooling and lubrication, and can have a low pressure level in order to limit or avoid system losses. In other words, the low pressure section can call for a significant quantity of oil, but not high pressure conditions.

Moreover, some the control systems according to the present invention comprise regulator means for directing excess oil from the high pressure section to a lubrication and cooling system, and for keeping pressure in the high pressure section substantially constant.

In some embodiments, the method of operating a DCT power control system comprising the features described above is characterized by the following method steps:

Closing, in a low speed mode, a directional valve that is disposed in a line (conduit) leading from pump means to the lubrication and cooling section, and operating two pump outlets of the pump means in parallel, thereby forcing oil to flow through a check valve disposed in a first branch line of the low pressure section leading to the high pressure section; opening, in a medium speed mode, the directional valve of the low pressure section by activating an ON/OFF valve creating an ON/OFF pilot pressure for the directional valve, wherein the ON/OFF valve is disposed in a connection line branching of the first branch line of the low pressure section between the check valve and the high pressure system; and maintaining, in a high speed mode, the first pressure outlet of the pump means at a high pressure level and maintaining the second pressure outlet of the pump means continuously at a low pressure level by activating the ON/OFF valve of the directional valve.

In some embodiments, the advantageous effect of this operating strategy is, especially in a medium speed mode, a lowering of power consumption, as usually in this operating mode there is enough flow and quantity of oil at high pressure created by only one pump stage, provided that no activation is needed. If such an activation is needed, the second pump outlet can be switched to the high pressure section, which results in the advantage that the medium speed range is made very wide.

In all the above-described modes, it is also possible to operate a proportional pressure-relief valve controlled by a proportional pressure-reducing valve to provide constant pressure in both the low pressure and high pressure section, causing oil to be drained into the lubrication and cooling system if the pressure is too high.

Further features, advantages and embodiments of the present invention will become apparent from the following description and accompanying drawings.

BRIEF DESCRIPTION OF THE DRAWINGS

The FIGURE shows a simplified hydraulic switching diagram of a hydraulic power control system according to an embodiment of the present invention.

DETAILED DESCRIPTION

The control system illustrated in the accompanying FIGURE comprises pump means 020 being a fixed displacement double action pump having a first pressure outlet X and a second pressure outlet Y.

With pump means 020, it is possible to create an oil flow proportional to engine speed, in contrast to a variable displacement pump that diminishes the amount of oil flow per revolution of the engine.

In connection with the additional features of the control system to be described below, the illustrated pump means 020 is able to lower power consumption by lowering oil flow at low and high pressure levels, and by lowering the low pressure by creating a short circuit that will be described in detail later.

Moreover, it is possible to lower the high pressure when torque to be transmitted is lower than its maximum. Nevertheless, if high pressure is needed, especially if an actuation is desired, the low pressure level can be put back to a high pressure level so that the entire system is very flexible, thereby making it possible to minimize power consumption.

To achieve these effects, the control system according to an embodiment of the present invention additionally includes hydraulic control means comprising the following features: a directional valve 050 disposed in a main line $050_L$ of a low pressure section LPS between pump means 020 and a lubrication and cooling system LCS. The directional valve 050 is controlled by an ON/OFF valve 040. The ON/OFF valve 040 is disposed between a check valve 060 and the directional valve 050. The check valve 060 is disposed in a branch line $060_L$ of the low pressure section LPS leading to a high pressure section HPS. The low pressure section LPS is depicted in the FIGURE by dark black lines, while the high pressure HPS section is depicted by dotted lines.

Regulator means 030 are provided for directing excess oil from the high pressure section HPS to the lubrication and cooling system LCS, and for keeping the pressure in the high pressure section HPS constant. The regulator means 030 preferably takes the form of a proportional pressure relief valve being disposed in a first branch line $030_L$ of a main line $M_L$ of the high pressure section HPS. The branch line $030_L$ branches off the main line $M_L$ at a first branching point $P_1$ between the pump means 020 and the actuator side of the DCT being represented by block ACT.

The illustrated embodiment of the control system comprises a proportional pressure reducing valve 080 disposed in a second branch line $080_L$ of the main line $M_L$ fluidly connected with the proportional pressure relief valve 030 by a first feed back line $FB_{L1}$ As shown in the drawings, there is, furthermore, a check (safety) valve 070 in a branch line $070_L$ branching off the main line $M_L$ between the pump means 020 and the first branching point $P_1$ that is activated in case of an excessively high pressure in the high pressure section HPS.

A pressure sensor 880 is provided in the main line $M_L$ after a second branching point $P_2$ being disposed between point $P_1$ and the ACT for giving control feedback.

Branching point $P_2$ is a point where the second branch line $080_L$ branches off the main line $M_L$ with the proportional pressure-reducing valve 080 being disposed in the branch line $080_L$. The proportional pressure-reducing valve 080 is adapted for reducing/creating a pilot pressure for the proportional pressure-relief valve 030 that is pilot operated by the proportional pressure-reducing valve 080 to keep the system pressure stable. A pilot pressure is a reference pressure so that the proportional pressure-relief valve 030 knows how much oil is to be relieved to keep the system pressure constant. In case oil is to be relieved by the pressure-relief valve 030, the oil is guided to the lubrication and cooling system of the DCT, represented in the drawing by the block LCS. As shown in the drawing, the ON/OFF valve 040 is disposed in a branch line $040_L$, and creates an ON/OFF pressure for the directional valve 050 that directs oil from the low pressure section LPS to a check valve 061 leading to the lubrication and cooling system LCS.

In case valve 040 is blocked, oil flows to the high pressure section HPS through the check valve 060 disposed in the branch line $060_L$ of the branch line $050_L$ of the low pressure section LPS.

Moreover, in some embodiments there is a second ON/OFF valve 041 disposed in a branch line $041_L$ branching off from the main line $M_L$ of the high pressure section at a third branching point $P_3$ disposed upstream of point $P_1$. The valve 041 can be, as well as valve 040, a 3/2 ON/OFF valve for creating a pilot pressure for a 2/2 directional valve 051 for connecting the low pressure section side (outlet Y) of the pump means 020 with the suction side $S_s$ of the pump means 020. Such a connection constitutes a short circuit that has the effect of a minimization of the pump losses when the pump 020 is not needed, e.g. when it is operating in a high speed operating condition where the pressure level is sufficiently high.

Finally, the illustrated embodiment of the control system comprises two throttles 031 and 032 in feed back lines $FB_{L2}$ and $FB_{L1}$ respectively, that are provided for the purpose of dampening and for achieving pressure stability in the entire system.

In addition to the written description of the control means according to the present invention, reference is herewith made to the drawing for the purpose of additional disclosure.

What is claimed is:

1. A method of operating a DCT hydraulic power control system having a pump, a high pressure section for providing oil to actuators of the DCT, a low pressure section for providing oil to a lubrication and cooling system of the DCT, and a regulator for directing excess oil from the high pressure section to the lubrication and cooling section and for keeping pressure in the high pressure section constant, the method comprising:

closing, in a low speed mode, a directional valve disposed in a main line of the low pressure section for leading oil to the lubrication and cooling section of clutches of the DCT; operating two pump outlets of the pump in parallel, thereby forcing oil to flow through a check valve disposed in a first branch line of the low pressure section leading to the high pressure section;

opening, in a medium speed mode, the directional valve in the main line of the low pressure section by activating an ON/OFF valve to create an ON/OFF pilot pressure for the directional valve in a connecting line branching off the first branch line; and maintaining, in a high speed mode, a first pressure outlet of the pump at a high pressure level and keeping a second pressure outlet of the pump continuously at a low pressure level by activating the ON/OFF valve of the directional valve.

2. The method according to claim 1, further comprising switching, in the medium speed mode, the second outlet of the pump to the high pressure section.

3. The method according to claim 1, further comprising short circuiting, in the high speed mode, the low pressure section via a 2/2 directional valve disposed in a second branch line of the low pressure section branching off the main line by activating the ON/OFF valve to create a pilot pressure for the 2/2 directional valve.

4. A DCT hydraulic power control system comprising:
a pump;
a high pressure section for providing oil to actuators of the DCT;
a low pressure section for providing oil to a lubrication and cooling system of the DCT; and
a regulator for directing excess oil from the high pressure section to the lubrication and cooling section and for keeping pressure in the high pressure section substantially constant, wherein the pump is a fixed displacement double action pump having a first pressure outlet and a second pressure outlet,
a hydraulic control comprising:
a first directional valve disposed in a main line of the low pressure section between the pump and the lubrication and cooling system, the first directional valve controlled by an ON/OFF valve disposed between a check valve and the first directional valve, the check valve disposed in a branch line of the low pressure section leading to the high pressure section; and
a second directional valve connecting the second pressure outlet associated to the low pressure section with a suction side of the pump.

5. The DCT hydraulic power control system according to claim 4, further comprising a proportional pressure-relief valve constituting the regulator and disposed in a first branch line of a main line of the high pressure section, the first branch line branching off the main line at a first branching point between the pump and the actuators.

6. The DCT hydraulic power control system according to claim 5, further comprising a proportional pressure-reducing valve disposed in a second branch line off the main line of the high pressure section and fluidly connected with the proportional pressure-relief valve by a first feed back line.

7. The DCT hydraulic power control system according to claim 4, wherein the second directional valve comprises a 2/2 directional valve.

* * * * *